(12) United States Patent
Lu

(10) Patent No.: US 9,326,219 B2
(45) Date of Patent: Apr. 26, 2016

(54) WEB SERVER AND NETWORK CONNECTION METHOD THEREOF

(71) Applicant: proeasy network solutions co., LTD., Hsinchu County (TW)

(72) Inventor: Hsing-Hung Lu, Hsinchu County (TW)

(73) Assignee: proeasy network solutions co., LTD., Hsinchu County (TW)

( * ) Notice: Subject to any disclaimer, the term of this patent is extended or adjusted under 35 U.S.C. 154(b) by 0 days.

(21) Appl. No.: 14/559,931

(22) Filed: Dec. 4, 2014

(65) Prior Publication Data

US 2016/0066250 A1 Mar. 3, 2016

(30) Foreign Application Priority Data

Aug. 27, 2014 (TW) .............................. 103129510 A

(51) Int. Cl.
| | | |
|---|---|---|
| G06F 15/16 | (2006.01) | |
| G06F 15/173 | (2006.01) | |
| H04W 48/02 | (2009.01) | |
| H04W 88/08 | (2009.01) | |
| H04W 8/18 | (2009.01) | |
| G06F 17/30 | (2006.01) | |
| G06Q 20/00 | (2012.01) | |

(52) U.S. Cl.
CPC ............... *H04W 48/02* (2013.01); *H04W 8/18* (2013.01); *H04W 88/08* (2013.01); *G06F 17/30876* (2013.01); *G06Q 20/00* (2013.01)

(58) Field of Classification Search
CPC ................ H04M 1/72561; H04M 2203/1008; H04M 2207/18; H04M 3/42076; H04W 64/00; H04W 4/02; H04W 88/16; G06Q 30/06; G06Q 30/0601; G06F 17/30876

USPC ........................ 455/414.1, 418, 550.1, 552.1; 709/223–227

See application file for complete search history.

(56) References Cited

U.S. PATENT DOCUMENTS

| | | | |
|---|---|---|---|
| 8,200,550 B2 | 6/2012 | Aitkins | |
| 2002/0046279 A1* | 4/2002 | Chung | ................... G06Q 20/00 709/227 |
| 2004/0203595 A1 | 10/2004 | Singhal | |
| 2006/0018311 A1* | 1/2006 | Kobayashi | .......... H04M 1/2535 370/356 |

(Continued)

FOREIGN PATENT DOCUMENTS

| | | |
|---|---|---|
| CN | 201812499 | 4/2011 |
| TW | 200943890 | 10/2009 |

(Continued)

OTHER PUBLICATIONS

"Office Action of Taiwan Counterpart Application", issued on Jan. 21, 2016, p. 1-p. 5.

*Primary Examiner* — Olumide T Ajibade Akonai
(74) *Attorney, Agent, or Firm* — Jianq Chyun IP Office

(57) ABSTRACT

A web server and a network connection method for local network log-in are provided. The method includes receiving a first calling signal from a mobile communication device through a mobile phone network, identifying a phone number of the mobile communication device according to the first calling signal from the mobile communication device, and permitting the mobile communication device to access an operating interface by using a class C network uniform resource locator through a local area network, and the phone number is contained in the class C network uniform resource locator. Accordingly, users can connect to the local network easily and safely through the provided web server.

6 Claims, 4 Drawing Sheets

(56) References Cited

U.S. PATENT DOCUMENTS

2008/0132218 A1* 6/2008 Samson ............ H04M 1/72561
455/418
2014/0235170 A1* 8/2014 Zhang .................. H04W 4/008
455/41.2
2015/0113381 A1* 4/2015 Fu ........................... H04W 4/18
715/234

FOREIGN PATENT DOCUMENTS

| TW | 201033927 | 9/2010 |
|----|-----------|--------|
| TW | M413179 | 10/2011 |
| TW | 201334496 | 8/2013 |
| TW | 201413627 | 4/2014 |
| WO | 2013019160 | 2/2013 |

* cited by examiner

WEB SERVER AND NETWORK CONNECTION METHOD THEREOF

CROSS-REFERENCE TO RELATED APPLICATION

This application claims the priority benefit of Taiwan application serial no. 103129510, filed on Aug. 27, 2014. The entirety of the above-mentioned patent application is hereby incorporated by reference herein and made a part of this specification.

BACKGROUND OF THE INVENTION

1. Field of the Invention

The invention relates to a web server and a network connection method thereof.

2. Description of Related Art

While enjoying delicacies is one joyful thing in life, waiting in line is nothing but chore. When we plan to dine at our favorite restaurant, a booking by phone or on-line system is often required before we can go to the restaurant at the appointed time. If the dining is decided offhand, it is likely that we will be on an on-site waiting list. Currently, methods for managing the on-site waiting list adopted by most of the restaurants usually include the followings. First, service personnel of the restaurant records names and phones of customers and registers their queuing orders in handwritten manner. When there are tables available, the customers can be notified the same via phone call one-by-one. Alternatively, in the case of food court environment, the customers need to line up to pay for the meal in order to obtain a meal-receiving serial number or a restaurant pager from the restaurant. When the meal is ready, the restaurant will notify the customers to take the meal by ways of manual number-calling, queue calling system, or vibration of the restaurant pager.

With the method of registering in handwritten manner as described above, the customers do not have to wait near the restaurant, but the restaurant needs to invest manpower in assisting the registration. With the method of manual number-calling or queue calling system, the customers need to wait near the restaurant in order to observe the serial numbers being called. In addition, though the restaurant pager is much more user-friendly, issues related to maintenance of equipment cannot be overlooked. Accordingly, it is one of the major subjects in the industry as how to provide a simple method which allows the customers to register for the dining easily while allowing the restaurant to manage the same more conveniently.

SUMMARY OF THE INVENTION

The invention is directed to a web server and a network connection method thereof, and capable of receiving a call from a user, identifying a phone number of the user, allowing the user to use a mobile communication device to access an operating interface according to the phone number and a class C network uniform resource locator, so as to easily and safely execute web operations of local network.

A web server is provided according to an exemplary embodiment of the invention. The web server includes a microprocessor unit, a first communication circuit, a second communication circuit and a web service module. The first communication device is coupled to the microprocessor unit, and configured to receive a first calling signal from a mobile communication device through a mobile phone network. The second communication circuit is coupled to the microprocessor unit, and configured to connect to a local area network. The web service module is coupled to the microprocessor unit, and configured to provide an operating interface corresponding to a service. The first communication device is further configured to identify a phone number of the mobile communication device according to the first calling signal from the mobile communication device. In addition, the web service module permits the mobile communication device to access the operating interface through the local area network by using a class C network uniform resource locator. The phone number is contained in the class C network uniform resource locator.

In an exemplary embodiment of the invention, the web server further includes a counter. The counter is coupled to the microprocessor unit. When the first calling signal is received by the first communication device, the counter is enabled and starts to count a time corresponding to the phone number. In addition, the web service module permits the mobile communication device to access the operating interface through the local area network by using the class C network uniform resource locator only when the time corresponding to the phone number is less than a pre-defined time threshold.

In an exemplary embodiment of the invention, the class C network uniform resource locator of the web server further includes a service code. The service code is corresponding to the service.

In an exemplary embodiment of the invention, the web server further includes a storage circuit. The storage circuit is configured to store the phone number of the mobile communication device after the first communication circuit identifies the phone number of the mobile communication device according to the first calling signal from the mobile communication device. In addition, the web service module permits the mobile communication device to access the operating interface through the local area network by using the class C network uniform resource locator according to the phone number stored in the storage circuit. When the time corresponding to the phone number is not less than the predefined time threshold, the web service module removes the phone number of the mobile communication device and the time corresponding to the phone number stored in the storage circuit.

An exemplary embodiment of the invention provides a network connection method for a web server providing an operating interface corresponding to a service. The network connection method includes: receiving a first calling signal from a mobile communication device through a mobile phone network, identifying a phone number of the mobile communication device according to the first calling signal from the mobile communication device, and permitting the mobile communication device to access an operating interface by using a class C network uniform resource locator through a local area network. In addition, the phone number is contained in the class C network uniform resource locator.

In an exemplary embodiment of the invention, the network connection method further includes: starting to count a time corresponding to the phone number when the first calling signal is received. The step of permitting the mobile communication device to access the operating interface through the local area network by using the class C network uniform resource locator is executed only when the time corresponding to the phone number is less than a pre-defined time threshold.

In an exemplary embodiment of the invention, the class C network uniform resource locator in the network connection method further includes a service code. The service code is corresponding to the service.

In an exemplary embodiment of the invention, the network connection method further includes: storing the phone number of the mobile communication device into a storage circuit after identifying the phone number of the mobile communication device by a first communication circuit according to the first calling signal from the mobile communication device; and removing the phone number of the mobile communication device and the time corresponding to the phone number stored in the storage circuit when the time corresponding to the phone number is not less than the predefined time threshold. The step of permitting the mobile communication device to access the operating interface through the local area network by using the class C network uniform resource locator includes: permitting the mobile communication device to access the operating interface through the local area network by using the class C network uniform resource locator according to the phone number stored in the storage circuit.

Based on above, the web server and the network connection method thereof according to the exemplary embodiments of the invention are provided. Accordingly, after the phone call is made to the web server by using the mobile communication device, the user may use the mobile communication device to connect to the server provided by the business through Wi-Fi connection by using the class C network uniform resource locator containing the phone number of the user, so as access the local operating interface. As a result, the user is able to quickly and safely operate with web pages for waiting and ordering, which are established by the business.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
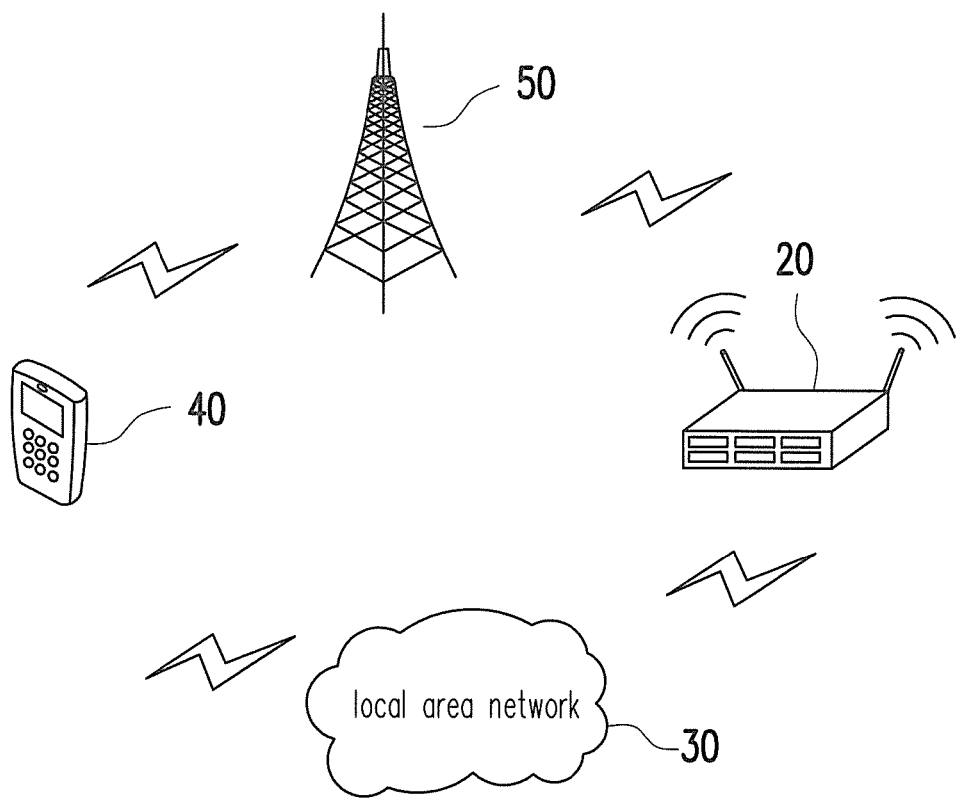
FIG. 1 is a schematic diagram illustrating a web server and a network connection according to an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Generally, a network environment for the restaurant and the food court is relatively simple. In the present exemplary embodiment, wireless network equipments and techniques are used together with a mobile communication device own by a user to simplify steps for the customers to wait on-site and provide a secure method for accessing web pages. This will provide the customers with favorable dinning experience and allow the restaurant to manage more conveniently. The present exemplary embodiment is developed based on the above concept.

FIG. 1 is a schematic diagram illustrating a web server and a network connection according to an exemplary embodiment.

Referring to FIG. 1, a connection environment for web server includes a web server 20, a local area network 30, a mobile communication device 40 and a mobile phone network 50.

The web server 20 provides an operating interface corresponding to a service. In the present exemplary embodiment, the operating interface is implemented in form of web page. Nevertheless, it should be understood that the invention is not limited thereto. The web server 20 also provides a class C network uniform resource locator (URL) (i.e., a web address) for accessing the operating interface. Particularly, the web server 20 only permits an electronic device of the user to access the operating interface by using the class C network uniform resource locator containing a phone number of the user. The class C network herein refers to an IP (Internet Protocol) address of the web server 20 correspondingly assigned by the local area network 30. For instance, the address of this class C network is "192.168.1.1". Therefore, the class C network uniform resource locator containing the phone number of the user is, for example, "http://192.168.1.1/0988188188".

In an exemplary embodiment of the invention, the class C network uniform resource locator further includes a service code, and the service code is corresponding to the service provided by the web server 20. In an embodiment of the invention, the service code refers to a business number, which is configured to distinguish between different businesses. For example, "http://192.168.1.1/aaa0988188188" is for the operating interface of a shop A; "http://192.168.1.1/bbb0988188188" is for the operating interface of a shop B; "http://192.168.1.1/ccc0988188188" is for the operating interface of a shop C; and the rest can be inferred from the above. In another embodiment of the invention, the service code may also be a food and beverage service code, which is configured to distinguish between different food and beverage services. For example, "http://192.168.1.1/jjj0988188188" is for the operating interface of food; "http://192.168.1.1/qqq0988188188" is for the operating interface of beverage; "http://192.168.1.1/kkk0988188188" is for the operating interface of takeout; and the rest can be inferred from the above. However, the invention is not limited thereto. It should be noted that, herein, "0988188188" is an exemplary example of the phone number of the user.

The local area network 30 is a wireless local area network (Wi-Fi) established according to Local Area Network (LAN) protocol transmission standard. For example, this LAN protocol transmission standard is 802.11 series constituted by Institute of Electrical and Electronics Engineers (IEEE). However, the invention is not limited thereto.

The mobile communication device 40 is a mobile communication equipment of the user, which includes Subscriber Identity Module Card (SIM Card). The mobile communication device 40 is, for example, a cell phone, a personal digital assistant (PDA) phone, a smart phone, and so on. However, the invention is not intended to limit types of the mobile communication device 40.

The mobile phone network 50 is a telecommunication service provided by a telecommunication service provider, such as Global System For Mobile Communications (GSM), Code Division Multiple Access (CDMA), Personal Handy-phone System, (PHS) and so on.

In the present exemplary embodiment, the web server 20 receives a calling signal from the mobile communication device 40 through the mobile phone network 50. In addition, the web server 20 may also receive a connection request from the mobile communication device 40 through the local area network 30. When the connection request of the mobile communication device 40 is permitted, the web server 20 will provide the operating interface corresponding to the service. In the present exemplary embodiment, the operating interface is in form of web page, and the mobile communication device 40 uses a browser with a web address (i.e., Uniform Resource Locator (URL)) provided by the web server 20 to open a service web page through Wi-Fi connection. However, in another embodiment of the invention, the operating interface may also be in form of application (APP).

Figure 2:
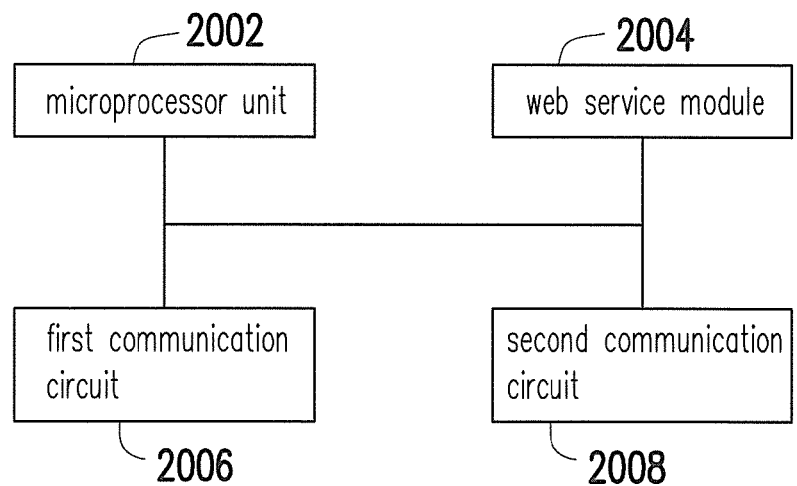
FIG. 2 is a block diagram illustrating a web server according to an exemplary embodiment.

FIG. 2 is a block diagram illustrating a web server according to an exemplary embodiment.

Referring to FIG. 2, the web server 20 includes a microprocessor unit 2002, a web service module 2004, a first communication circuit 2006 and a second communication circuit 2008.

The microprocessor unit 2002 may be a hardware with computing capabilities (e.g., a chip set, a processor, etc.) which is configured to control overall operation of the web server 20. In the present exemplary embodiment, the microprocessor unit 2002 is, for example, a central processing unit (CPU) or other programmable microprocessors, a digital signal processor (DSP), a programmable controller, an application specific integrated circuits (ASIC), a programmable logic device (PLD) or other similar devices.

The web service module 2004 is coupled to the microprocessor unit 2002, and provides a web page operating interface corresponding to a restaurant service by adopting a standard language interpretable by a web browser. For example, the standard language includes HyperText Markup Language (HTML), eXtensible HyperText Markup Language (XHTML), eXtensible Markup Language (XML), Active Server Pages (ASP), Hypertext Preprocessor (PHP) and so on. However, the invention is not limited thereto.

The first communication circuit 2006 is coupled to the microprocessor unit 2002 and operates by using a transmission standard or a protocol compatible with the mobile phone network 50. For example, the first communication circuit 2006 is capable of transferring and receiving a short message or a voice signal through the mobile phone network 50.

The second communication circuit 2008 is coupled to the microprocessor unit 2002 and operates by using a transmission standard or a protocol compatible with the local area network 30 in order to transfer or receive packets through the local area network 30.

In an exemplary embodiment of the invention, when an operation of waiting and ordering is to be performed, the user needs to make a phone call to the web server 20 by using the mobile communication device 40. The web server 20 can identify the phone number of the mobile communication device 40 according to the calling signal of the mobile communication device 40 without answering this phone call. Subsequently, the mobile communication device 40 may request for connecting to a web service interface of the web server 20 by using the web address provided by the web server 20 and containing the phone number.

Specifically, the first communication circuit 2006 receives a first calling signal (not illustrated) from the mobile communication device 40 through the mobile phone network 50, and identifies the phone number of the mobile communication device 40 according to the first calling signal. Thereafter, when the second communication circuit 2008 receives the connection request with the class C network uniform resource locator containing the phone number of the user from the mobile communication device 40 through the local area network 30, the second communication circuit 2008 can permit the mobile communication device 40 to operate the web service interface according to the phone number of the user contained therein. Accordingly, the mobile communication device 40 can perform the operation of ordering or other services by operating the web service interface.

Figure 3:
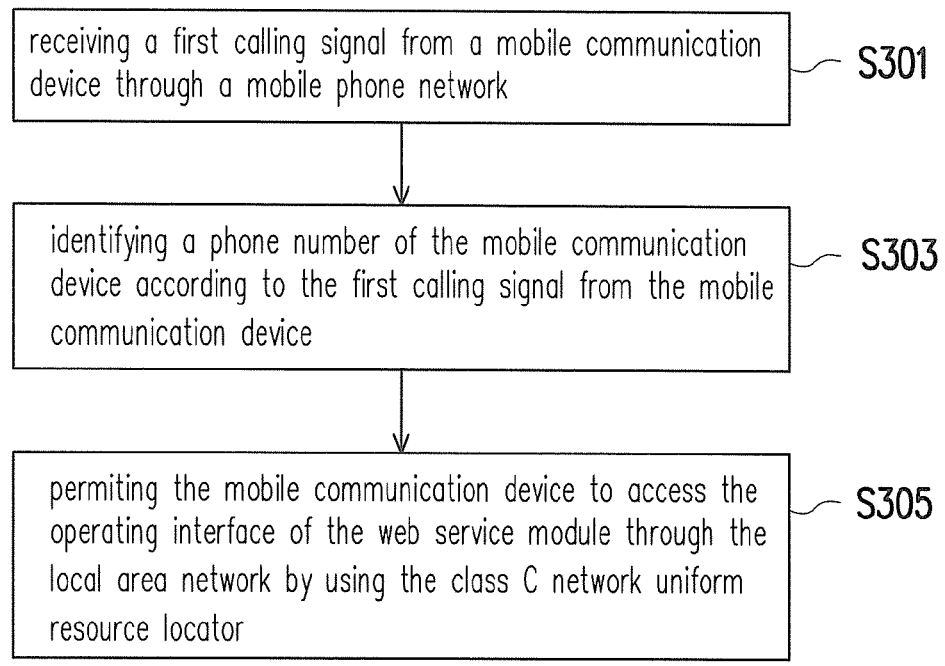
FIG. 3 is a flowchart illustrating a network connection method according to an exemplary embodiment.

FIG. 3 is a flowchart illustrating a network connection method according to an exemplary embodiment.

Referring to FIG. 3, first, as shown in step S301, the first communication circuit 2006 receives the calling signal (hereinafter, referred to as the first calling signal) from the mobile communication device 40 through the mobile phone network 50. Subsequently, in step S303, the first communication device 2006 identifies the phone number of the mobile communication device 40 according to the first calling signal from the mobile communication device 40. Further, in step S305, the second communication circuit 2008 permits the mobile communication device 40 to access the operating interface of the web service module 2004 through the local area network 30 by using the class C network uniform resource locator.

In order to further ensure the security, in another exemplary embodiment of the invention, the web server can further limit that the user must access the operating interface by using the class C network uniform resource locator containing the phone number of the user within a time period after transferring the calling signal by using the mobile communication device 40. Several exemplary embodiments regarding the limited connection time will be described in details below with reference to accompany the drawings.

Figure 4:
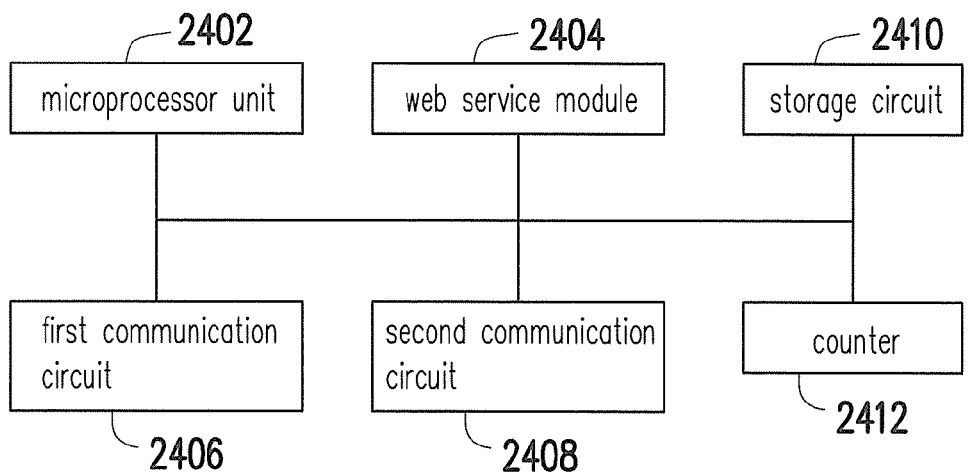
FIG. 4 is a block diagram illustrating a web server according to another exemplary embodiment.

FIG. 4 is a block diagram illustrating a web server according to another exemplary embodiment.

Referring to FIG. 4, a web server 24 includes a microprocessor 2402, a web service module 2404, a first communication circuit 2406, a second communication circuit 2408, a storage circuit 2410 and a counter 2412.

Structures of the microprocessor unit 2402, the first communication circuit 2406 and the second communication circuit 2408 are substantially identical to the microprocessor unit 2002, the first communication circuit 2006 and the second communication circuit 2008 respectively as disclosed in the embodiment of FIG. 2, and thus related descriptions thereof are not repeated hereinafter.

The web service module 2404 is coupled to the microprocessor unit 2402, and provides a web page operating interface corresponding to a restaurant service by adopting a standard language interpretable by a web browser. For example, the standard language includes HyperText Markup Language (HTML), eXtensible HyperText Markup Language (XHTML), eXtensible Markup Language (XML), Active Server Pages (ASP), Hypertext Preprocessor (PHP) and so on. However, the invention is not limited thereto.

The storage circuit 2410 is coupled to the microprocessor unit 2402. The storage circuit 2410 may be an embedded storage unit or an external storage unit. The embedded storage unit may be a random access memory (RAM), a read-only memory (ROM), a flash memory, a magnetic disk storage device, and so on. The external storage unit may be Compact Flash (CF) memory card, Secure Digital (SD) memory card, Micro SD memory card, Memory Stick (MS) memory card, and so on. Specifically, in the exemplary embodiments of the invention, the storage circuit 2410 is configured to store the phone number identified by the first communication circuit 2406 according to the first calling signal (not illustrated) from the mobile communication device 40. Further, the storage circuit 2410 is also capable of storing one or more applications and operating systems in order to control operation of the web server 24. When the second communication circuit 2408 receives a connection request of the class C network uniform resource locator transferred from the mobile communication device 40 through the local area network 30, the web service module 2404 can identify whether the phone number contained in the class C network uniform resource locator exists in the storage circuit 2410. If the phone number exists in the storage circuit 2410, the web service module 2404 can permit the mobile communication device 40 to access the web page operating interface.

The counter 2412 is coupled to the microprocessor unit 2402. In an embodiment of the invention, the counter 2412 can also be implemented by ways of hard circuits or program codes, which are particularly limited by the invention. Specifically, when the first communication circuit 2406 receives the calling signal from the mobile communication device 40 through the mobile phone network 50 and identifies the incoming number of the mobile communication device 40 according to the calling signal of the mobile communication device 40, the counter is enabled and starts to count and record a time corresponding to the incoming number.

Particularly, when the time corresponding to the incoming number of the mobile communication device 40 is not less than a predefined time threshold, the web service module 2404 removes the phone number of the mobile communication device 40 and the time corresponding to the phone number stored in the storage circuit 2410. Accordingly, the web service module 2404 is capable of limiting that the mobile communication device 40 must perform the connection within a period of time after transferring the calling signal.

For example, after the first communication circuit 2206 receives the calling signal from the phone number "0988188188" and identifies the incoming number, The counter 2412 activates a counter T1 corresponding to "0988188188" and the predefined time threshold is set to 10 minutes. If the second communication circuit 2208 receives the connection request from "http://192.168.1.1/aaa0988188188" and identifies the incoming number to be "0988188188" within 10 minutes, the web service module 2404 locates a record regarding the phone number "0988188188" in the storage circuit 2412 and permits for accessing such web page operating interface. When the counter T1 is counted for over 10 minutes, the web service module 2404 removes the record regarding the phone number "0988188188" from the storage circuit 2412. Accordingly, if the second communication circuit 2208 receives the connection request from "http://192.168.1.1/aaa0988188188" and identifies the incoming number to be "0988188188" after 10 minutes, because the record regarding the phone number "0988188188" no longer exists in the storage circuit 2412, the web service module 2404 will block the web page operating interface from being accessed.

Figure 5A:
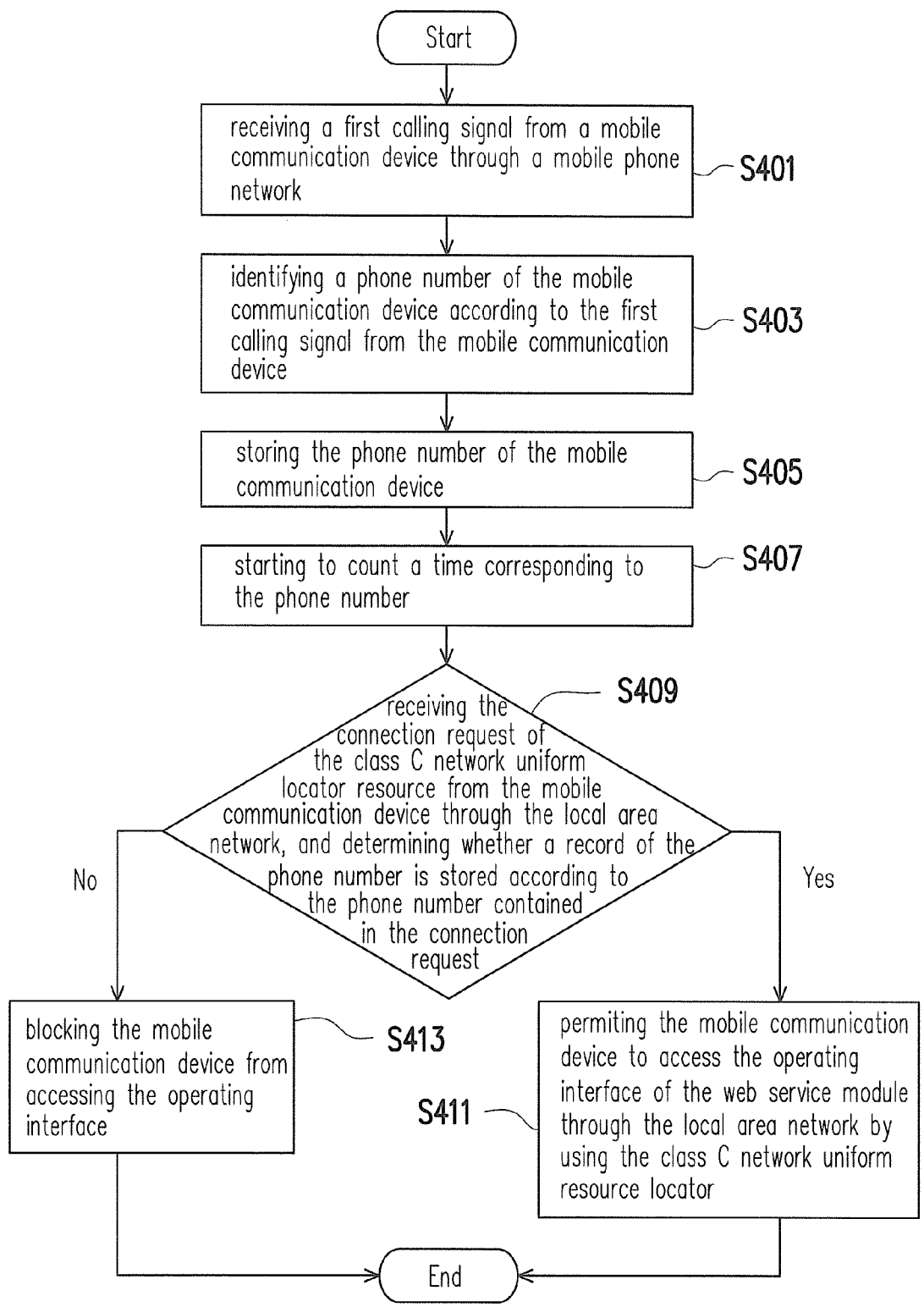
FIG. 5A and FIG. 5B are flowcharts illustrating a network connection method according to another exemplary embodiment.
Figure 5B:
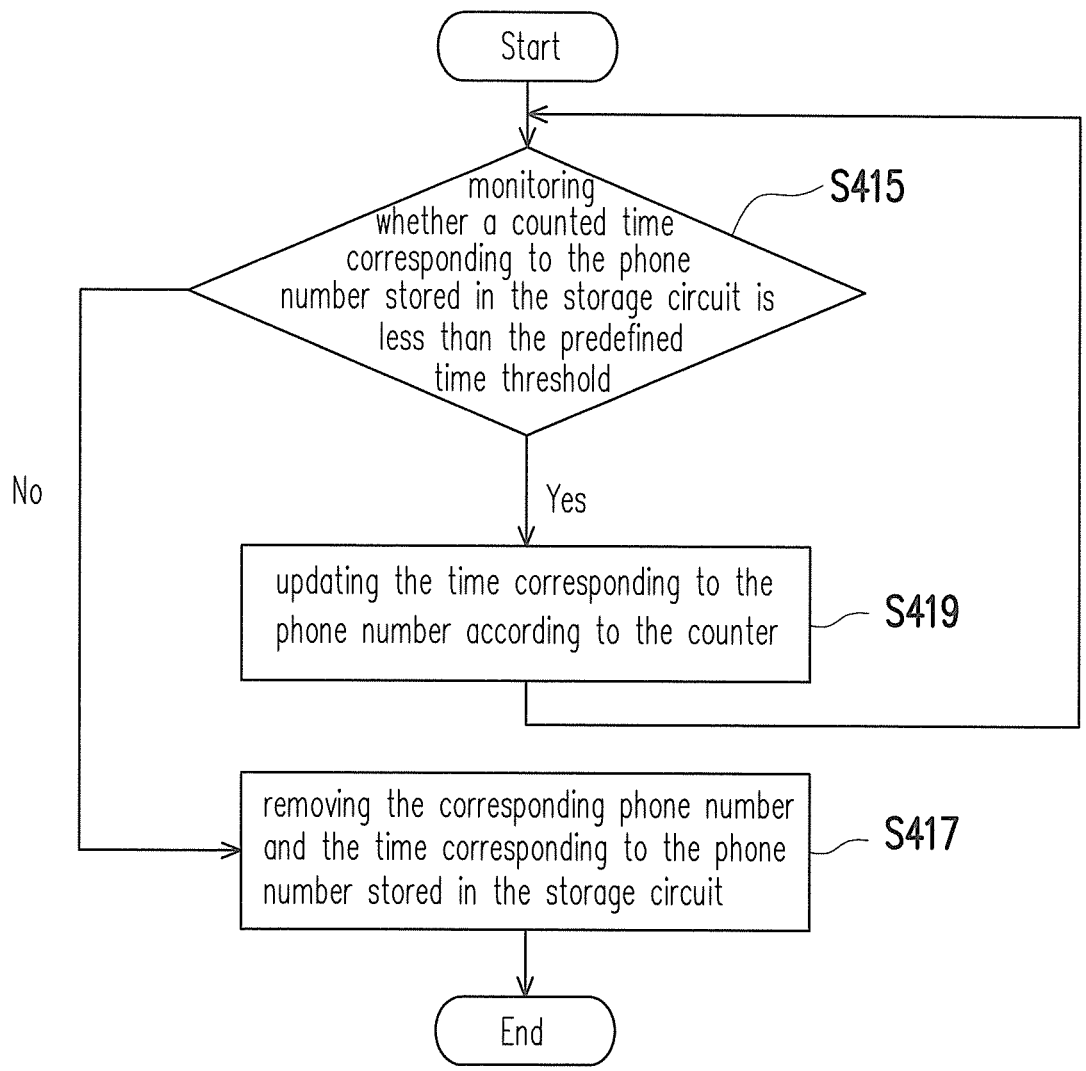

FIG. 5A and FIG. 5B are flowcharts illustrating a network connection method according to another exemplary embodiment.

Referring to FIG. 5A, first, as shown in step S401, the first communication circuit 2406 receives a calling signal (hereinafter, referred to as the first calling signal) from the mobile communication device 40 through mobile phone network 50.

In step S403, the first communication circuit 2406 identifies a phone number of the mobile communication device 40 according to the first calling signal from the mobile communication device 40.

In step S405, the first communication circuit 2406 stores the phone number of the mobile communication device 40 into the storage circuit 2410.

In step S407, the counter 2412 starts to count a time corresponding to the phone number and stores the time into the storage circuit 2410.

In step S409, when the second communication circuit 2208 receives the connection request of the class C network uniform resource locator containing the phone number from the mobile communication device 40 through the local area network 30, the web service module 2404 determines whether a record of the phone number is stored in the storage circuit 2410 according to the phone number contained in the connection request.

If the record of the phone number is stored in the storage circuit 2410, in step S411, the web service module 2404 permits the mobile communication device 40 to access the operating interface of the web service module 2404 through the local area network 30 by using the class C network uniform resource locator.

If the record of the phone number is not stored in the storage circuit 2410, in step S413, the web service module 2404 blocks the mobile communication device from accessing the operating interface.

Referring to FIG. 5B, on the other hand, in step S415, the web service module 2404 monitors whether a counted time corresponding to the phone number stored in the storage circuit 2410 is less than the predefined time threshold.

If the counted time corresponding to the phone number stored in the storage 2410 is not less than the predefined time threshold, in step S417, the web service module 2404 removes the corresponding phone number and the time corresponding to the phone number which are stored in the storage circuit 2410.

If the counted time corresponding to the phone number stored in the storage circuit 2410 is less than the predefined time threshold, in step S419, the web service module 2404 updates the time corresponding to the phone number according to the counter.

In summary, in the web server and the network connection method according to the exemplary embodiments of the invention, the user is identified by using the phone number, so that the mobile communication device may be permitted to connect the web server by using the class C network uniform resource locator containing the phone number. As a result, the users are able to perform the operation of waiting and ordering at the local network by using the mobile communication device in convenient, secure, simple and easy manners.

Although the present invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A web server, comprising:
a microprocessor unit;
a first communication device coupled to the microprocessor unit, wherein the first communication device is configured to receive a first calling signal from a mobile communication device through a mobile phone network;

a counter coupled to the microprocessor unit;

a second communication circuit coupled to the microprocessor unit, wherein the second communication device is configured to connect to a local area network; and a web service module coupled to the microprocessor unit, wherein the web service module is configured to provide an operating interface corresponding to a service, wherein the first communication device is further configured to identify a phone number of the mobile communication device according to the first calling signal from the mobile communication device, wherein the web service module permits the mobile communication device to access the operating interface through the local area network by using a class C network uniform resource locator, wherein the phone number is contained in the class C network uniform resource locator, wherein the counter is enabled and starts to count a time corresponding to the phone number when the first calling signal is received by the first communication device, wherein the web service module permits the mobile communication device to access the operating interface through the local area network by using the class C network uniform resource locator only when the time corresponding to the phone number is less than a pre-defined time threshold.

2. The web server of claim 1, wherein the class C network uniform resource locator further comprises a service code, wherein the service code is corresponding to the service.

3. The web server of claim 1, further comprising: a storage circuit configured to store the phone number of the mobile communication device after the first communication circuit identifies the phone number of the mobile communication device according to the first calling signal from the mobile communication device, wherein the web service module permits the mobile communication device to access the operating interface through the local area network by using the class C network uniform resource locator according to the phone number stored in the storage circuit, wherein the web service module removes the phone number of the mobile communication device and the time corresponding to the phone number stored in the storage circuit when the time corresponding to the phone number is not less than the predefined time threshold.

4. A network connection method for a web server providing an operating interface corresponding to a service, and the network connection method comprising:

receiving a first calling signal from a mobile communication device through a mobile phone network;

starting to count a time corresponding to the phone number when the first calling signal is received;

identifying a phone number of the mobile communication device according to the first calling signal from the mobile communication device; and permitting the mobile communication device to access the operating interface through a local area network by using a class C network uniform resource locator, wherein the phone number is contained in the class C network uniform resource locator, wherein the step of permitting the mobile communication device to access the operating interface through the local area network by using the class C network uniform resource locator is executed only when the time corresponding to the phone number is less than a pre-defined time threshold.

5. The network connection method of claim 4, wherein the class C network uniform resource locator further comprises a service code, wherein the service code is corresponding to the service.

6. The network connection method of claim 4, further comprising:

storing the phone number of the mobile communication device into a storage circuit after identifying the phone number of the mobile communication device according to the first calling signal from the mobile communication device; and removing the phone number of the mobile communication device and the time corresponding to the phone number stored in the storage circuit when the time corresponding to the phone number is not less than the predefined time threshold, wherein the step of permitting the mobile communication device to access the operating interface through the local area network by using the class C network uniform resource locator comprises: permitting the mobile communication device to access the operating interface through the local area network by using the class C network uniform resource locator according to the phone number stored in the storage circuit.

* * * * *